(12) United States Patent
Raj et al.

(10) Patent No.: US 10,909,490 B2
(45) Date of Patent: Feb. 2, 2021

(54) SYSTEMS AND METHODS FOR WORKER RESOURCE MANAGEMENT

(71) Applicant: Vocollect, Inc., Pittsburgh, PA (US)

(72) Inventors: Mohit Raj, Haryana (IN); Saurabh Mittal, Haryana (IN); Kaushik Hazra, West Bengal (IN); Krishna Udupi, Hyderabad (IN); Neeraj Singh, Rajasthan (IN); Amal Vaish, Utter Pradesh (IN); Amit Kumar, Bijnor (IN)

(73) Assignee: VOCOLLECT, INC., Pittsburgh, PA (US)

( * ) Notice: Subject to any disclaimer, the term of this patent is extended or adjusted under 35 U.S.C. 154(b) by 943 days.

(21) Appl. No.: 14/880,482

(22) Filed: Oct. 12, 2015

(65) Prior Publication Data

US 2016/0117627 A1  Apr. 28, 2016

(30) Foreign Application Priority Data

Oct. 15, 2014 (IN) .......................... 2944/DEL/2014

(51) Int. Cl.
*G06Q 10/06* (2012.01)

(52) U.S. Cl.
CPC .............................. *G06Q 10/06398* (2013.01)

(58) Field of Classification Search
None
See application file for complete search history.

(56) References Cited

U.S. PATENT DOCUMENTS

| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,294,969 | B2 | 10/2012 | Plesko |

(Continued)

FOREIGN PATENT DOCUMENTS

| EP | 3009968 A1 | 4/2016 |
| WO | 2013163789 A1 | 11/2013 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Folashade Anderson
(74) *Attorney, Agent, or Firm* — Alston & Bird LLP

(57) ABSTRACT

A worker resource management system may include a voice-directed mobile terminal that enables a dialog between a user and the voice-directed mobile terminal. At least one computer may be in communication with the mobile terminal. The computer can include a worker resource management module that receives and records user activity from the voice-directed mobile terminal. The worker resource management module can identify user productivity patterns and provide work assessment predictions based at least in part upon the user activity that is received and recorded. Management can make worker resource decisions in response to the user productivity patterns identified or the work assessment predictions provided by the worker resource management module.

20 Claims, 4 Drawing Sheets

(56) References Cited

U.S. PATENT DOCUMENTS

| | | |
|---|---|---|
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,532,282 B2 * | 9/2013 | Bracey ............... G06F 11/3438 379/265.06 |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |

(56) References Cited

U.S. PATENT DOCUMENTS

| | | | |
|---|---|---|---|
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule, III et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,222 B2 | 9/2016 | Singel et al. |
| 9,448,610 B2 | 9/2016 | Davis et al. |
| 9,478,113 B2 | 10/2016 | Xie et al. |
| 9,582,696 B2 | 2/2017 | Barber et al. |
| 9,616,749 B2 | 4/2017 | Chamberlin |
| 9,618,993 B2 | 4/2017 | Murawski et al. |
| D785,636 S | 5/2017 | Oberpriller et al. |
| 9,715,614 B2 | 7/2017 | Todeschini et al. |
| 9,728,188 B1* | 8/2017 | Rosen ............... G10L 15/22 |
| 9,734,493 B2 | 8/2017 | Gomez et al. |
| 2002/0129139 A1* | 9/2002 | Ramesh ........... G06F 11/3495 |
| | | 709/224 |
| 2007/0063048 A1 | 3/2007 | Havens et al. |
| 2007/0080930 A1* | 4/2007 | Logan ................. G06Q 10/06 |
| | | 345/156 |
| 2009/0006164 A1* | 1/2009 | Kaiser ................. G06Q 10/06 |
| | | 705/7.14 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2011/0237287 A1* | 9/2011 | Klein .................. H04M 3/42178 |
| | | 455/521 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0197678 A1* | 8/2012 | Ristock ............... G06Q 10/06 |
| | | 705/7.15 |
| 2012/0203647 A1 | 8/2012 | Smith |
| 2012/0223141 A1 | 9/2012 | Good et al. |
| 2012/0253548 A1 | 10/2012 | Davidson |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0325763 A1* | 12/2013 | Cantor ................ G06Q 10/06 |
| | | 706/12 |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |

(56) References Cited

U.S. PATENT DOCUMENTS

| | | |
|---|---|---|
| 2014/0058801 A1* | 2/2014 | Deodhar ............ G06Q 10/0639 705/7.38 |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El Akel et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |

(56) References Cited

U.S. PATENT DOCUMENTS

| | | | |
|---|---|---|---|
| 2015/0220753 | A1 | 8/2015 | Zhu et al. |
| 2015/0236984 | A1 | 8/2015 | Sevier |
| 2015/0254485 | A1 | 9/2015 | Feng et al. |
| 2015/0261643 | A1 | 9/2015 | Caballero et al. |
| 2015/0312780 | A1 | 10/2015 | Wang et al. |
| 2015/0324623 | A1 | 11/2015 | Powilleit |
| 2015/0327012 | A1 | 11/2015 | Bian et al. |
| 2016/0014251 | A1 | 1/2016 | Hejl |
| 2016/0040982 | A1 | 2/2016 | Li et al. |
| 2016/0042241 | A1 | 2/2016 | Todeschini |
| 2016/0057230 | A1 | 2/2016 | Todeschini et al. |
| 2016/0092805 | A1* | 3/2016 | Geisler ............... G06Q 10/0633 705/7.27 |
| 2016/0109219 | A1 | 4/2016 | Ackley et al. |
| 2016/0109220 | A1 | 4/2016 | Laffargue |
| 2016/0109224 | A1 | 4/2016 | Thuries et al. |
| 2016/0112631 | A1 | 4/2016 | Ackley et al. |
| 2016/0112643 | A1 | 4/2016 | Laffargue et al. |
| 2016/0117627 | A1 | 4/2016 | Raj et al. |
| 2016/0124516 | A1 | 5/2016 | Schoon et al. |
| 2016/0125217 | A1 | 5/2016 | Todeschini |
| 2016/0125342 | A1 | 5/2016 | Miller et al. |
| 2016/0133253 | A1 | 5/2016 | Braho et al. |
| 2016/0171720 | A1 | 6/2016 | Todeschini |
| 2016/0178479 | A1 | 6/2016 | Goldsmith |
| 2016/0180678 | A1 | 6/2016 | Ackley et al. |
| 2016/0189087 | A1 | 6/2016 | Morton et al. |
| 2016/0125873 | A1 | 7/2016 | Braho et al. |
| 2016/0227912 | A1 | 8/2016 | Oberpriller et al. |
| 2016/0232891 | A1 | 8/2016 | Pecorari |
| 2016/0292477 | A1 | 10/2016 | Bidwell |
| 2016/0294779 | A1 | 10/2016 | Yeakley et al. |
| 2016/0306769 | A1 | 10/2016 | Kohtz et al. |
| 2016/0314276 | A1 | 10/2016 | Sewell et al. |
| 2016/0314294 | A1 | 10/2016 | Kubler et al. |
| 2016/0377414 | A1 | 12/2016 | Thuries et al. |
| 2017/0200108 | A1* | 7/2017 | Au ................... G06Q 10/06398 |
| 2018/0091654 | A1* | 3/2018 | Miller ............... H04M 3/42221 |
| 2019/0114572 | A1* | 4/2019 | Gold ................ G06Q 10/06398 |
| 2019/0124388 | A1* | 4/2019 | Schwartz ......... H04N 21/42203 |

FOREIGN PATENT DOCUMENTS

| | | | |
|---|---|---|---|
| WO | 2013173985 | A1 | 11/2013 |
| WO | 2014019130 | A1 | 2/2014 |
| WO | 2014110495 | A1 | 7/2014 |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User'S Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/676,109 for *Indicia Reader*;In re: Huck, filed Apr. 1, 2015.

Office Action for European Application No. 15 189 657.8 dated May 12, 2017, 6 pages.

Search Report and Written Opinion in counterpart European Application No. 15189657.8 dated Feb. 5, 2016, pp. 1-7.

Office Action in related European Application No. 15189657.8 dated May 12, 2017, pp. 1-6 [All references previously cited.].

Annex to the communication dated Jan. 3, 2019 for EP Application No. 15189657.9.

Annex to the communication dated Jul. 6, 2018 for EP Application No. 15189657.9.

Annex to the communication dated Nov. 19, 2018 for EP Application No. 15189657.9.

Decision to Refuse European Application No. 15189657.9, dated Jul. 6, 2018, 2 pages.

Summons to attend Oral Proceedings for European Application No. 15189657.9, dated Jan. 3, 2019, 2 pages.

* cited by examiner

SYSTEMS AND METHODS FOR WORKER RESOURCE MANAGEMENT

CROSS-REFERENCE TO RELATED APPLICATION

The present application claims the benefit of Indian Patent Application No. 2944/DEL/2014 for SYSTEMS AND METHODS FOR WORKER RESOURCE MANAGEMENT filed Oct. 15, 2014. The foregoing patent application is hereby incorporated by reference in its entirety.

FIELD

Embodiments of the present invention relate to the field of worker resource management and, more specifically, to worker resource management in a warehouse environment.

BACKGROUND

Wearable, mobile, and/or portable computer terminals are used for a wide variety of tasks. Such terminals allow workers to maintain mobility, while providing the user with desirable computing, data gathering, and data-processing functions. Furthermore, such terminals often provide a communication link to a larger, more centralized computer system.

One example of a particular use environment for a wearable terminal is in connection with a warehouse management system (WMS). A WMS generally involves product distribution and inventory management. One example of a commercial management system is VOCOLLECT VOICE SOLUTIONS™ from Honeywell International, Inc.

An overall integrated management system may utilize a central computer system that runs a program for product tracking/management and for order-filling via shipping. A plurality of mobile terminals may be employed within the system so that workers may communicate with the central system in relation to product handling and other related tasks.

One particularly efficient system is a voice-directed system that utilizes a voice-directed workflow. More specifically, to provide an interface between the central computer system and the workers or other users, such wearable terminals and the central systems to which they are connected are often voice-driven or speech-driven (e.g., operated or controlled at least in part using human speech). A bi-directional communication stream of information (i.e., a dialog) may be exchanged, typically over a wireless network, between the wireless wearable terminals and the central computer system. Information received by each wireless wearable terminal from the central system may be translated from text into voice instructions or commands for the corresponding worker. The mobile terminals and voice-directed work provide a significant efficiency in the performance of the workers' tasks. Specifically, using such terminals, the data-processing work is done virtually hands-free without cumbersome equipment to juggle or paperwork to carry around.

Typically, in order to communicate in a voice-driven system, the worker wears a headset which is communicatively coupled to a wearable or portable terminal. The headset has a microphone for voice data entry and an ear speaker for playing instructions (e.g., voice instructions). Through the headset, the workers are able to receive voice instructions regarding assigned tasks, ask questions, report the progress of tasks, and report working conditions such as inventory shortages.

Therefore, an overall integrated management system generally involves a combination of a central computer system for tracking and management, mobile devices (e.g., wearable terminals), and the users who use and interface with the computer system. Such users may be in the form of workers/operators such as order fillers and pickers (e.g., selection operators picking and placing items), or supervisors that access and monitor the system information. The workers handle the manual aspects of the integrated management system under the command and control of information transmitted from the central computer system to the wireless wearable terminal.

An illustrative example of a set of tasks suitable for a wireless wearable terminal with voice capabilities may involve initially welcoming the worker to the computerized inventory management system and defining a particular task or order, for example, filling a load for a particular delivery vehicle scheduled to depart from a warehouse at a certain specified time. The worker may then answer with a particular area (e.g., "working in freezer area") that he will be working in order to fill that given order. The worker may then be directed to pick items to fill a pallet or bin used for the order.

The system may vocally direct the worker to a particular aisle and bin to pick a particular quantity of an item. The worker may vocally confirm the locations visited, the number of picked items, and/or various other information relating to worker activities. Once the bin or pallet is filled, the system may then direct the worker to a loading dock or bay for a particular truck or other delivery vehicle that will receive that order. As will be appreciated, the specific communications between the wireless wearable terminal and the central computer system for such voice-directed work can be task-specific and highly variable.

In addition to responding to inquiries or confirming the completion of certain tasks, the terminals may also allow the workers to interface with the computer system for other activities such as when they are starting/ending a shift (i.e., logging in or out of the system), and when starting/ending a break activity. For example, in order to indicate the beginning of a break activity the worker may report to the computer system through the headset using standard break vocabulary such as "take a break" followed by the type of break the worker wishes to take (e.g., lunch break, coffee break, etc.).

In existing management systems, workers may be checked and monitored by management based upon their performance with regard to multiple parameters. These parameters can include, but are not limited to, the workers' work rate (i.e., the pace at which the worker is performing their assigned tasks) and the workers' break durations. It is difficult in existing systems, however, to ascertain the workers' idle duration around reported break activities (i.e., before and after breaks). Determining worker idle duration around reported break activities is useful information for a supervisor because workers may generally cease or slow work activity before reporting break activities and/or after reporting returning from break activities. Although such worker idleness around break activities may affect the workers' overall work rate, in some cases workers may be able to achieve an acceptable work rate without having attracted attention from the supervisor.

In the described situation where the reported work rate remains at acceptable levels notwithstanding worker idle duration around reported break activities, the management system would not be providing potentially useful information to the supervisor regarding whether the work assigned to the worker is less than his or her capability, or if the workload in general can be increased for all the workers. This adversely affects the warehouse performance in terms of completing the work in a stipulated time period, and can result in problems for warehouse supervisors such as delayed assignments, required overtime, and related expenses causing cost overruns.

In other related situations, a worker may be working in an assigned team of workers for a given task relating to, for example, preparing an order for delivery to a customer. One worker in the group may be trying to slow the pace of the teams' work, and it is difficult to identify or flag this worker in real time. Identification may be possible based upon a periodic work rate report, but by the time the report issues harm has already been done to the warehouse operations (e.g., to the delivery schedules). Existing management systems and methods do not provide an effective way to determine, in real-time, which worker is causing delay.

Notwithstanding the benefits that a warehouse management system can provide, at times there are delays in completing work assignments. Problems in completing a given assignment can have ripple effects to a full shift, and even a whole day's work schedule (or beyond). This affects planning in terms of the resources needed, such as the workers that would be needed to complete the work in the remaining period of time. Also, with delays there may be a requirement for communicating a new estimated time of arrival (ETA) to a customer. Even if a calculation can be done to assess the delay, it becomes critical to monitor the situation going forward.

In some situations, delays may only become visible only towards a shifts' end, or at a periodic situational evaluation by supervisor. It might be too late at this point to take any remedial measures based upon the delay, and even if measures are taken there may be cost overruns in worker overtime or customer dissatisfaction (or both).

There could be other times when the opposite situation occurs in a warehouse environment; i.e., when given work assignments are completed too soon leaving some workers idle for a period of time (e.g., for a two hour period). This may be referred to as a problem of plenty. In this situation, there are resource management problems relating to work assessment, work allocation, work production, etc. In existing systems, however, these situations would not be identified until after the problem has occurred resulting in a loss of man hours which otherwise could have been put to better use.

Another situation which can arise is a combination of the two problems previously identified. A warehouse could be divided among teams working in different regions or there could be an allocation of groups of workers per truck route. While one team may be struggling to finish assigned work towards the end of shift, the other team may have become idle an hour before. In such cases, there is a need for a system which can forewarn the onset of a problematic situation relating to resource management.

As set forth above, while the utilization of voice-directed mobile terminals and management systems tends to improve worker efficiency, existing weaknesses in current systems remain in achieving maximized worker resource allocation. Accordingly, a need exists for management systems and methods that analyze worker productivity based at least in part on worker activity data retrieved from a voice-directed mobile terminal. A need also exists for systems and methods for work assessment predictions based at least in part on worker activity data retrieved from a voice-directed mobile terminal.

SUMMARY

Accordingly, in one aspect, the present invention embraces a worker resource management system including a voice-directed mobile terminal for facilitating a dialog between a user and the voice-directed mobile terminal. The system may include a computer in communication with the voice-directed mobile terminal, the computer including a worker resource analysis module. The worker resource analysis module may be configured to receive user activity information from the voice-directed mobile terminal, and identify user productivity patterns based at least in part upon the user activity information.

In one exemplary embodiment, the system includes a visual display in communication with the computer.

In another exemplary embodiment, the visual display provides reports corresponding to user productivity patterns.

In yet another exemplary embodiment, the visual display provides alerts corresponding to user productivity patterns.

In yet another exemplary embodiment, the worker resource analysis module is configured to classify user activity information into groups including user workflow tasks, user sign-in activity, user sign-out activity, user break activity, and/or user region changes.

In yet another exemplary embodiment, the user productivity patterns include user break duration, user idle time after sign-in, user idle time before sign-off, user idle time before beginning break activity, and/or user idle time after returning from break activity.

In yet another exemplary embodiment, the user productivity patterns are identified at fixed interval time periods immediately preceding the current identification time.

In yet another exemplary embodiment, the user productivity patterns identified are flagged based upon the most recent interval period immediately preceding a current identification time.

In another aspect, the present invention embraces a worker resource management system including a voice-directed mobile terminal for facilitating a dialog between a user and the voice-directed mobile terminal. The system may also include a computer in communication with the voice-directed mobile terminal, the computer including a worker resource analysis module. The worker resource analysis module may be configured to receive user activity information from the voice-directed mobile terminal, and provide work assessment predictions based at least in part upon user activity information received.

In one exemplary embodiment, the system includes a visual display in communication with the computer.

In another exemplary embodiment, the visual display provides reports or alerts corresponding to the work assessment predictions.

In yet another exemplary embodiment, the work assessment predictions include information that more workers are needed in a region.

In yet another exemplary embodiment, the work assessment predictions include information that a delivery vehicle will be delayed beyond scheduled departure time.

In yet another exemplary embodiment, the work assessment predictions are based upon the number of work units remaining in a warehouse region, the number of workers present in a warehouse region's workforce, and/or the rate at which work is being completed in a warehouse region.

In yet another aspect, the present invention embraces a method for managing worker resources including transmitting task data from a server computer to a voice-directed mobile terminal in communication with the server. Speech-based instructions associated with the task data may be provided to a user using the voice-directed mobile terminal. User activity information may be received from the voice-directed mobile terminal. The user activity information may be analyzed to identify user productivity patterns or provide work assessment predictions. Worker resource management decisions may be implemented by management in response to the user activity information analysis.

In one exemplary embodiment, the user productivity patterns include user break duration, user idle time after sign-in, user idle time after sign-off, user idle time before beginning break activity, and/or user idle time after returning from break activity.

In another exemplary embodiment, the worker resource decisions include providing a productivity compliance alert to a worker based upon break duration compliance.

In yet another exemplary embodiment, the worker resource decisions include transferring a worker to a second work region from a first work region.

The foregoing illustrative summary, as well as other exemplary objectives and/or advantages of the invention, and the manner in which the same are accomplished, are further explained within the following detailed description and its accompanying drawings.

DETAILED DESCRIPTION

Embodiments of the present invention embrace systems and methods for worker resource management. The exemplary worker resource systems track and provide supervisors or other management with timely updates, analysis, and predictions relating to workforce management so that problems can be identified and addressed in real-time. Typically, at least a portion of the analyzed data is generated by, or used in connection with, a voice-directed mobile terminal.

Figure 1:
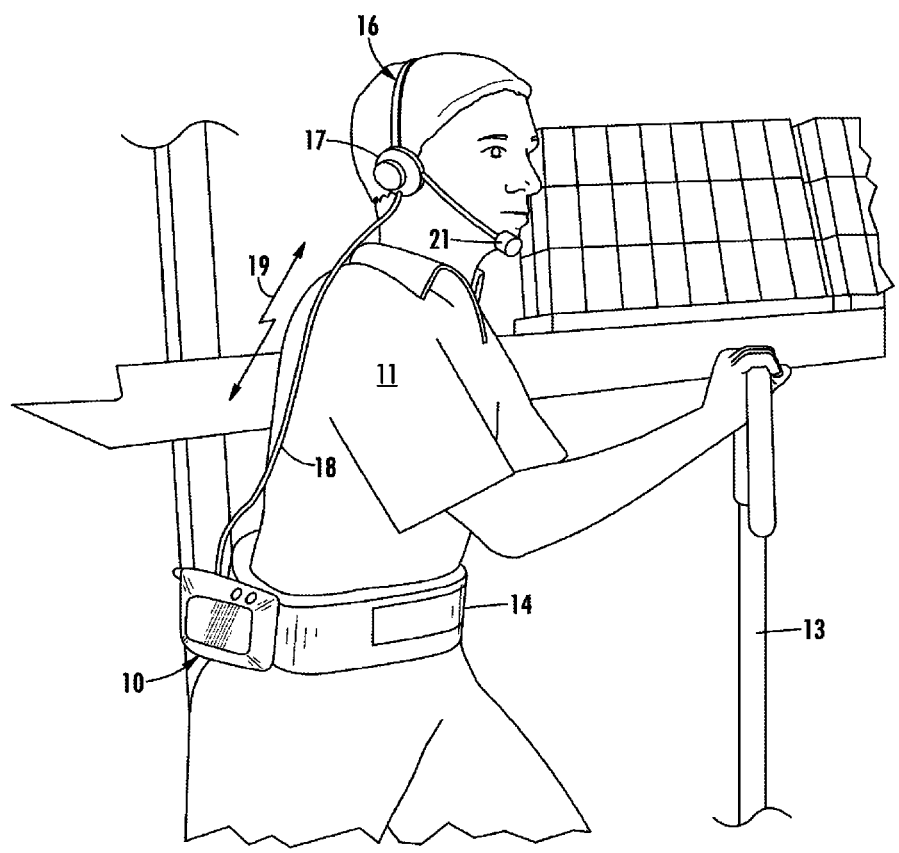
FIG. 1 is a perspective view of a worker using an exemplary voice-directed mobile terminal in accordance with one embodiment of a worker resource management system of the present disclosure.

FIG. 1 depicts an exemplary voice-directed mobile terminal 10 that may be used with embodiments of the worker resource management system according to the present invention. The voice-directed mobile terminal 10 may be a wearable device, which may be worn by a worker 11 (e.g., on a belt 14 as shown), or by some other user or operator. This allows for hands-free operation. The voice-directed mobile terminal 10 might also be manually carried or otherwise mounted on a piece of equipment such as an industrial vehicle (e.g., a forklift). The worker 11 is shown in FIG. 1 operating a pallet jack 13, which is a piece of transportation equipment that may be utilized by a worker in a warehouse environment.

The use of the descriptive term "terminal" is not limiting and may include any similar computer, device, machine, smartphone, smartwatch, indicia reader, combination, or system. Furthermore, the voice-directed mobile terminal may include multiple pieces with separate housings or may be contained in a single housing similar to the embodiment shown in FIG. 1. Therefore, the terminal may also include multiple wearable pieces. Alternatively, some or all of the terminal functionality may be incorporated into the headset, which may include all the features required to communicate with a server or external computer. Therefore, the exact form of the voice-directed mobile terminal utilized to practice the present systems and methods is not limited to only the embodiments shown in the drawings.

Although the present application may generally reference "users" that interface with the exemplary systems of the present disclosure, the descriptive term "worker" or "operator" as set forth herein may be more specifically used in reference to workers/operators that perform work on the floor in a manufacturing environment or work on the floor of a warehouse (e.g., fillers, pickers, etc.). Such workers/operators would typically be the users of mobile terminal 10 in connection with the exemplary system. Similarly, other "users" that interface with the exemplary systems may be described using the descriptive term "supervisor." As set forth herein, "supervisor" is generally in reference to a supervisor of workers/operators. The supervisors would generally have access to the graphical interface or display of the exemplary system as described below. The use of the descriptive terms "worker/operator" and "supervisor" in relation to users of the exemplary systems are not limiting and may include any similar member of an organization (staff member, manager, etc.).

Figure 2:
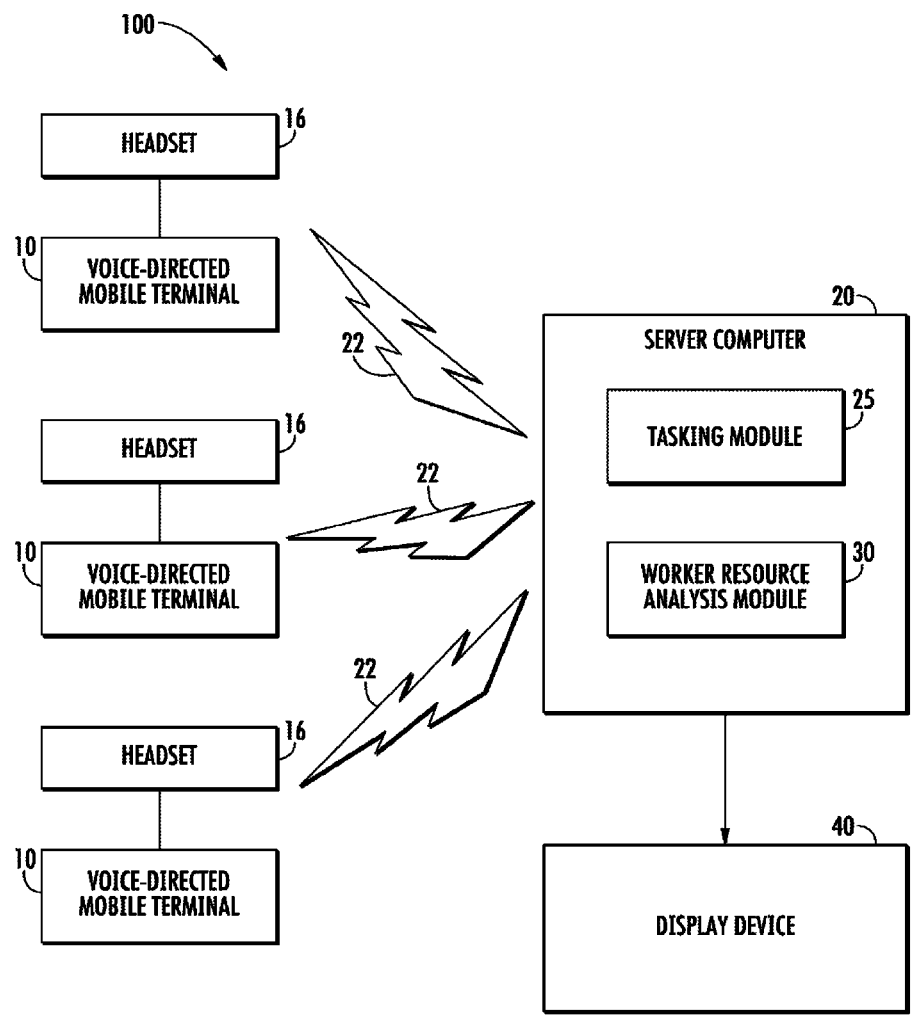
FIG. 2 is a block diagram illustrating certain components of an exemplary worker resource management system according to the present disclosure.

The voice-directed mobile terminal 10 is typically a voice-driven device in that it includes speech interfaces to permit a worker 11 to communicate, using speech or voice, with an external computer such as server computer 20 as illustrated in FIG. 2. Typically, the voice-generated mobile terminal's speech interfaces are configured to be capable of permitting multiple different workers to communicate with the server computer as illustrated at FIG. 2 (e.g., using speech-recognition technology that recognizes different English dialects, different languages, etc.).

It will be appreciated by a person of ordinary skill in the art that the server computer 20 may be one or, more typically, a plurality of computers having software stored thereon. The server computer 20 may run one or more system software packages for handling/executing a particular task or set of tasks, such as inventory and warehouse management systems (which are available in various commercial forms), or any other systems where multiple tasks are handled by multiple workers. The server computer 20 may be any of a variety of different computers, including both client and server computers working together, and/or databases, and/or systems necessary to interface with multiple voice-directed mobile terminals 10 and associated with multiple different workers, to provide the work tasks that may be related to the products or other items handled in the voice-directed work environment.

The server computer 20 may include a Warehouse Management System (WMS), a database, and a Web application (not explicitly shown). The server computer 20 might also include a computer for programming and managing the individual voice-directed mobile terminals 10. The server computer 20 may be located at one facility or be distributed at geographically distinct facilities. Furthermore, the server computer 20 may include a proxy server. Therefore, the server computer 20 is not limited in scope to a specific configuration.

Alternatively, the voice-directed mobile terminals 10 may be stand-alone devices which interface directly with a worker 11 without a server computer. Therefore, various aspects of the present disclosure might be handled with voice-directed mobile terminals only. Usually, however, to have sufficient database capability to handle large amounts of information, a server computer is desirable.

In an exemplary embodiment, the voice-directed mobile terminal 10 communicates with the server computer 20 using a wireless communication link 22 (FIG. 2). The wireless link may be established through an appropriate wireless communication format (e.g., 802.11b/g/n) and may use one or more wireless access points that are coupled to the server computer 20 and accessed by the voice-directed mobile terminal 10. To allow the workers 11 to communicate with the system, one or more peripheral devices, including a headset 16 (e.g., earpiece, earbuds, etc.), are coupled to the voice-directed mobile terminal 10.

The headset 16 may be coupled to the voice-directed mobile terminal 10 through a wired connection such as cord 18 or by a wireless headset connection illustrated in FIG. 1 as reference numeral 19 (e.g., using the BLUETOOTH wireless protocol). The headset 16 may be worn on the head of the user/worker 11 and may use a microphone 21 for directing voice responses and activity reports to the voice-directed mobile terminal 10. A headset speaker 17 provides (e.g., plays) voice commands to the worker 11. The voice-directed mobile terminal 10 thus carries on a speech dialog with a worker 11 and provides hands-free operation and voice-directed movement throughout a warehouse or other facility.

It will be appreciated by a person of ordinary skill in the art that, although exemplary embodiments presented herein incorporate voice-direction techniques, the present disclosure is not limited to speech-directed terminals. The present disclosure embraces any terminal that carries on a dialog via speech, text (e.g., through a keyboard), gestures, or other communicative activity, with a worker/operator (or other user).

The server computer 20 includes a tasking module 25 for transmitting specific task data (e.g., picking instructions, training information, scheduling information, or other information associated with a request for a worker to perform some task or provide some information) to the voice-directed mobile terminal 10. Typically, the tasking module 25 is a software module stored on the server computer 20. Alternatively, the tasking module 25 may be a hardware module, or a combination of hardware and software.

The voice-directed mobile terminal 10 may use the task data received from the tasking module 25 to generate audio outputs at the headsets and speakers. For example, text data may be converted using a text-to-speech (TTS) interface to provide voice direction to a worker. Speech input or feedback from a worker is generated at the headset microphone 21 and transmitted to the voice-directed mobile terminal 10 where it is processed by speech recognition circuitry or other speech processing circuitry (e.g., speech recognition software). Any data that is obtained from the voice dialog (e.g., worker speech data) may then be relayed to the server computer 20.

For example, in a worker resource management system 100, the voice-directed mobile terminal 10 receives instructions (e.g., task data) from the tasking module 25 and converts those instructions into an audio transmission (e.g., audio file) to be heard by a worker/operator 11 via a speaker 17. The worker executes the audio instructions and, for example, goes to a designated location and picks a designated product or performs some other task communicated by the audio instructions. The worker 11 then replies into the microphone 21, in a spoken language, such as with a verification of a location and/or a product, and the audio reply is converted to a useable data format (e.g., worker speech data) to be sent back and processed by the server computer 20. That is, in the voice-directed or speech directed work context, the worker 11 maintains a speech dialog (e.g., workflow dialog) with the voice-directed mobile terminal 10 and/or server computer 20 to execute and complete a variety of tasks.

In order to identify worker productivity patterns, all worker 11 dialog interactions through the system 100 may be recorded with a timestamp and maintained by the server computer 10 by a worker resource analysis module 30. Accordingly, the server computer 20 maintains information or data relating the user/worker 11 activity or inactivity. For example, when the operator 11 begins his or her shift, starting from that point until the operator 11 logs out of the system 100 at end of the shift the activities of the worker 11 are recorded.

Activities of the worker 11 that are recorded may be classified by worker resource analysis module 30. Classification types can include, for example, the particular workflow on which worker was working (e.g., selection, replenishment, etc.), sign in, sign out, break, region changes, etc.

Typically, the worker resource analysis module 30 is a software module stored on the server computer 20. Alternatively, the worker resource analysis module 30 may be a hardware module, or a combination of hardware and software.

The worker resource analysis module 30 generates, based at least in part upon an analysis of the worker activity dialog between the voice-directed mobile terminal 10 and the worker 11, productivity data. The productivity data relates to the analysis of information relating to user/worker 11 activity or inactivity.

The productivity information provided by the worker resource analysis module 30 includes determinations relating to idle time around worker sign on/off and worker breaks. In this regard, the worker resource analysis module 30 may calculate the time that elapses between the tasking module 25 assigning work and the information relating to user 11 activities such as sign on, break, and sign off events. All such calculations, except for sign on data, may be based on the 24-hour period preceding the current time that an analysis occurs.

The following information, which could aid the supervisor to take action regarding resource issues, is calculated by the worker resource analysis module 30 from various activities of the worker 11:

Break duration: The time (e.g., in minutes) between an operator issuing the "take a break" command and returning from break.

Idle time after signing in: The time (e.g., in minutes) from the operator signing in with his or her password and the first operator activity on an assignment.

Idle time before signing off: The time (e.g., in minutes) from the last pick (if the assignment is still in progress) or other operator activity on an assignment and the operator issuing the "sign off" command.

Idle time before break: The time (e.g., in minutes) from the last pick (if the assignment is still in progress) or other operator activity on an assignment and the operator issuing the "take a break" command.

Idle time after taking break: The time (e.g., in minutes) from the operator issuing the "take a break" command and the first operator activity on an assignment or a pick if the assignment is in progress.

The above noted reports or alerts can be evaluated by the module 30 at fixed time intervals; i.e., running every "X" minutes. Each run could consider the system 100 activity based upon the current time period minus "X" number of minutes. This would ensure that no stale data or past activity creeps into the current productivity report or alert that is provided to the supervisor for addressing a problem.

By way of example, a worker 11 may enter a "take a break" activity at 11:00 am. The worker's break activity may extend beyond ten minutes, while the acceptable break duration for evaluation purposes may only be five minutes. System evaluation by the worker resource module 30 may be scheduled to occur at five minute intervals. Thus, when the subsequent evaluation occurs at 11:06 am, the worker 11 would be flagged by the system 100 (e.g., the supervisor would be alerted). At the next evaluation of 11:11 am, if the worker had not returned from break the worker would remain flagged by the system. Alternatively, if the worker 11 has returned at this time period, the system 100 would assume normalcy and no further action would be assumed. This is possible because only a delta of system activity between 11:06 am-11:11 am was considered by the system (i.e., the current time minus "X" number of minutes where X is equal to five minutes in this example).

Exemplary implementation scenarios where workers productivity/idleness patterns can be monitored by the worker resource analysis module 30 are:

Workers idle time before sign off: Condition-A worker's last activity is greater than "X" minutes before his or her sign off time.

Workers taking longer breaks: Condition-Workers are taking breaks longer than "X" minutes.

Workers idle time before break: Condition-A worker's last activity is more than "X" minutes before the start of his or her break time.

Workers idle time after break: Condition-A worker's next activity is more than "X" minutes after the end of his or her break time.

Workers idle time after break: Condition-An operator's next activity is more than "X" minutes after the end of his or her break time.

With repeated evaluations, the most recent deflection can be flagged by the system. The frequency of evaluation period could be set proportional to how critical the monitored situation activity is.

The productivity data generated by the worker resource analysis module 30 may be viewed by a workforce supervisor overseeing, for example, the performance of picking operators on a warehouse floor, on a display device 40 (e.g., LCD monitor) that is in communication with the server computer 20. The communication will typically be wireless communication using a wireless method of communication method (e.g., SMS or text messaging, electronic mail, etc.). The workflow management system 100 may display the productivity data in raw form or in a compiled form (e.g., a summary report). In this regard, a supervisor may be provided with information regarding the productivity of the workforce (e.g., selection operators working a warehouse floor), a selected subgroup of the workforce, or an individual member of the workforce. In this way, the exemplary worker resource management system 100 according to the present disclosure can provide timely information relating to worker productivity.

Typically, the worker resource management system 100 is configured to receive and display at least a portion of the productivity data in real time, thereby allowing the workforce manager to take immediate corrective action to remedy the reported problem.

A supervisor may utilize the relevant productivity information to, for example, manage operator downtime and break compliance with productivity alerts; use these alerts and various charted data to determine the cause of missed goal rates or work schedules; and/or to make informed management decisions and personnel actions at the right time instead of waiting for shift end reports to identify anomalies in work patterns.

In another exemplary embodiment, worker resource management system 100 can track and compare worker task and activity progress across multiple warehouse regions at given points or intervals of time. For example, worker resource analysis module 30 of system 100 can provide information relating to whether an assigned group/team of workers 11 (e.g., Team 1) assigned work in one warehouse region (e.g., Region 1) is performing at a faster rate than a team of workers 11 (e.g., Team 2) in another region (e.g., Region 2) such that the workers 11 of Team 1 will be completing their selected tasks a certain time period (e.g., "X" number of minutes) before the workers 11 of Team 2 will complete their assigned tasks. In this regard, the worker resource analysis module 30 of system 100 can forewarn supervisors regarding the onset of problematic situations with worker resource management reporting and allow the supervisor to take appropriate corrective action. For example, the system 100 can report (e.g., via display device 40) if the team of workers 11 working in an exemplary Region 1 is performing better/faster than the workers 11 in Region 2 such that Region 1 work will be completed at a certain time (i.e., "X" minutes) before Region 2 work, which would therefore yield an excess of workers 11 in Region 1.

Some features of the exemplary system 100 include the capability to predict workforce shortages as well as surplus, real-time alerts/reports in response to changes, the ability to integrate with third-party applications, and the ability to monitor/manage the whole of warehouse operations.

The worker resource analysis module 30 of the exemplary system 100 may generally use the following information in generating reports/alerts: the work units remaining in a given warehouse region, the current number of workers present in a region's workforce, the current time for assigned work completion in a region, and/or the rate at which work is being completed in a given region (e.g., in units/hour). The exemplary system 100 can observe the described metrics in real-time and provide timely updates to supervisors relating to workload.

In one example for a specific use environment, the system 100 can analyze worker 11 activities/tasks in order to predict when workers 11 will finish picking tasks in a warehouse for items relating to a given delivery route such that the route then can depart for delivery. The worker's loading activities and time may be taken into account for more accurate predictions relating to delivery vehicle loading completion and subsequent delivery vehicle departure.

Figure 3:
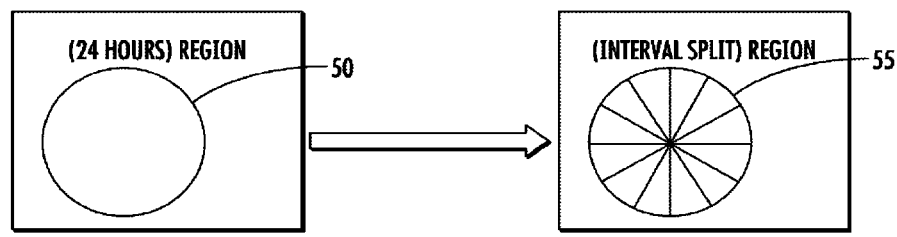
FIG. 3 is a graphical illustration depicting an exemplary warehouse region divided into time interval segments.

In order for the worker resource analysis module 30 of the system 100 to compare worker 11 task progress across multiple warehouse regions or across multiple vehicle loading projects at certain given points of time, warehouse operational hours can be divided into finite intervals or periods of time (i.e., chunks of time). For example, FIG. 3 illustrates an exemplary warehouse region as a 24-hour time period 50, and then further divides the region into segments of equal, two-hour time intervals 55.

Figure 4:
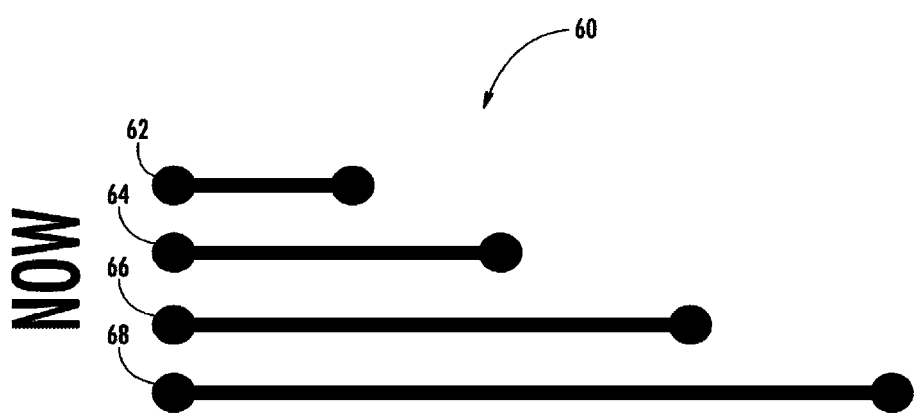
FIG. 4 is a graphical illustration depicting time interval segments for an exemplary warehouse region in line format.

FIG. 4 illustrates the time intervals 60 in line format stretching into the future from present time, which is designated as "Now." For example, if the current time (i.e., Now) is 1:00 pm, the next two-hour interval 62 runs to 3:00 pm; the next four-hour interval 64 runs to 5:00 pm; the next six-hour interval 66 runs to 7:00 pm; and the next eight-hour interval 68 runs to 9:00 pm. With intervals 60 established, worker resource analysis requiring a time window may then be considered.

In the item/product loading context for a delivery vehicle, workload for a given workforce region/route can be identified based upon the tasking module 25 assignment of the quantity of items to be picked by a worker 11 for the assignments that have a route delivery/departure falling within the given time intervals 60. The workload calculation for a subsequent interval (e.g., subsequent interval 64) will be inclusive of the workload of the previous interval (e.g., interval 62). For example, if interval 62 has workload of ten work units, interval 64 will have a workload of ten units plus the additional workload units that are included beyond the duration of interval 62.

The operators/workers 11 that are needed for a given region/route can be determined from the worker 11 activity recorded by the server computer 20 based upon factors including the quantity of items to be picked for the respective interval period, the actual rate at which items are being picked by workers 11, and the number of currently active/signed in operators 11.

Table 1 (below) is an exemplary operator requirement table noting the operators required for a given workload per exemplary regions (1-3) based upon departure intervals falling within the given intervals. For example, in the "Next" columns for Region 1 worker excess or shortage is listed respectively as −8, −8, 2, 11, and 24. This reveals an excess of eight operators until the "Next 06-hrs" interval when, due to the number of vehicles scheduled for departure, the work to be completed rises such that in addition to the eight operators, Region 1 now requires two additional workers to fulfill the Region's workload requirements.

TABLE 1

| Region Number | Operators Working | Next 02-hrs | Next 04-hrs | Next 06-hrs | Next 08-hrs | Next 10-hrs |
|---|---|---|---|---|---|---|
| 1 | 8 | −8 | −8 | 2 | 11 | 24 |
| 2 | 8 | −8 | −8 | 6 | 18 | 34 |
| 3 | 9 | −9 | −9 | 3 | 13 | 27 |

In order for the worker resource management system 100 to issue advance reports or alerts regarding the onset of potentially problematic situations with worker resource management, a number of factors are taken into account by the worker productivity analysis module 30. This includes the amount of work remaining (e.g., reported in workload units), the current number of workers 11 in the workforce (e.g., the number of users currently signed-in), the current projected time of work completion, and the current rate of work being accomplished (e.g., calculated in work-units/hour). These factors provide a basis for calculating the current demand for resources (e.g., time, workers, etc.). Certain exemplary factors/calculations that may be determined/reported through the worker resource analysis module 30 are set forth as follows:

Projected departure date:

Calculation=(Work Remaining)÷(Work Rate×Operators Required)+Current Time.

Projected departure delay: The time difference (e.g., in minutes) from expected departure date/time and the projected departure date/time of the delivery vehicle carrying the assignment or route items.

Calculation=Expected Departure−Projected Departure.

Operators required (REQ): The number of operators that are needed to work on a route or region to complete the route by the expected departure date and time.

Calculation: REQ=Workload÷(Work Rate).

Workload: The total number of items remaining to process during the chosen interval (e.g., expressed in items-per-minute for the items remaining for all assignments in the route).

Work Rate: number of items processed per minute (the average processing rate of active operators, or the region goal rate if there are no active operators).

Based on the given factors/calculations, the worker resource analysis module 30 can provide useful reports or alerts to supervisors. For example, reports/alerts may be provided to a supervisor indicating that "X" number of additional workers are needed in a region, that "X" number of workers are surplus in a region, that delivery departure in a region would be delayed by "X" minutes/hours beyond current scheduled departure time, that delivery departure time for a region would be ready "X" minutes/hours before the current scheduled departure time, and/or that the work assigned in a given region would be complete after "X" hours.

Providing the noted reports or alerts to supervisors well enough in advance would give supervisors time to make appropriate worker resource adjustments and avoid worker resource management problems. To counter adverse situations, steps could be taken including transferring "X" number of workers to a region where workers are currently needed from a region where there is a surplus, transferring "X" number of workers from a region where there is a surplus to region where workers are needed, transferring "X" number of workers to the trucks/routes which are most recently scheduled for departures followed by a transfer to the trucks/routes scheduled to depart next, etc.

The worker resource analysis module 30 of the exemplary system 100 therefore provides reports/alerts that improve warehouse management as respective regions/routes can be managed for completion at almost the same time. The exemplary system 100 also provides for less disparity in work completion percentage, allows delivery vehicles to depart at a known/scheduled time, allows workforce and other resources to be more effectively utilized, and allows for greater work progress given that worker re-allocation can be monitored in real time.

Although exemplary embodiments of the present disclosure relate to a warehouse setting, it will be appreciated by a person of ordinary skill in the art that the present disclosure embraces systems and methods that may be used in connection with other environments. For example, and without intending to limit the present disclosure, the systems and methods according to the present disclosure may be used in a retail store setting, a pharmacy setting, or a transport vehicle. The term warehouse, therefore, is used in its broadest sense and is not intended to limit the application of the disclosure to a particular physical environment.

It will be appreciated that the present disclosure additionally embraces methods associated with the embodiments of the systems according to the present disclosure.

To supplement the present disclosure, this application incorporates entirely by reference the following patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;

U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;

U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A worker resource management system, comprising:
a voice-directed mobile terminal for facilitating a voice communication between a user and the voice-directed mobile terminal, wherein the user is assigned a picking task in one of multiple warehouse regions and each warehouse region has a delivery vehicle with a scheduled departure time; and
a computer in communication with the voice-directed mobile terminal, the computer including a worker resource analysis module and a tasking module for transmitting a pick task instruction to the voice-directed mobile terminal, wherein the worker resource analysis module is configured to:
(i) record the voice communication between the user and the voice-directed mobile terminal with a corresponding timestamp that indicates when the voice communication occurred, based at least in part upon the voice communication received from the voice-directed mobile terminal over a communication link, (ii) record user activity information from the voice-directed mobile terminal based on the recorded voice communication at the time the voice communication occurred, wherein the user activity information comprises at least one of a break duration, a user idle time after sign-in, a user idle time before sign-off, a user idle time before beginning break activity, and a user idle time after returning from break activity, (iii) identify user productivity patterns for the user based at least in part upon the user activity information, (iv) provide an alert corresponding to the user productivity patterns at predefined intervals based on the break duration taken by the user and a break period predefined by the worker resource analysis module, and (v) provide a report of a projected departure time of the delivery vehicle from each of the multiple warehouse regions relative to the scheduled departure time based on a function of an amount of work remaining in the warehouse region, number of users operating in the warehouse region, current rate of work being accomplished, and current projected time of work completion.

2. The system of claim 1, comprising a visual display in communication with the computer.

3. The system of claim 2, wherein the visual display provides reports corresponding to the user productivity patterns.

4. The system of claim 2, wherein the visual display provides the alerts corresponding to the user productivity patterns.

5. The system of claim 1, wherein the worker resource analysis module is configured to classify user activity information into groups comprising user workflow tasks, user sign-in activity, user sign-out activity, user break activity, and/or user region changes.

6. The system of claim 1, wherein the user productivity patterns are identified at fixed interval time periods immediately preceding a current identification time.

7. The system of claim 6, wherein the user productivity patterns identified are based on 24-hour time periods immediately preceding the current identification time.

8. The system of claim 6, wherein the user productivity patterns identified are based on five minute time periods immediately preceding the current identification time.

9. The system of claim 6, wherein the user productivity patterns identified are flagged based upon the most recent interval period immediately preceding the current identification time.

10. A worker resource management system, comprising:
a voice-directed mobile terminal for facilitating a voice communication between a user and the voice-directed mobile terminal, wherein the user is assigned a picking task in one of multiple warehouse regions and each warehouse region has a delivery vehicle with a scheduled departure time; and
a computer in communication with the voice-directed mobile terminal, the computer including a worker resource analysis module and a tasking module for transmitting a pick instruction to the voice-directed mobile terminal, wherein the worker resource analysis module is configured to:

(i) record the voice communication between the user and the voice-directed mobile terminal with a corresponding timestamp based at least in part upon the voice communication received from the voice-directed mobile terminal over a communication link, (ii) record user activity information from the voice-directed mobile terminal based on recorded voice communication at the time the voice communication occurred, wherein the user activity information comprises of at least one of a break duration, a user idle time after sign-in, a user idle time before sign-off, a user idle time before beginning break activity, and a user idle time after returning from break activity, (iii) provide work assessment predictions based at least in part upon user activity information received recorded, (iv) provide an alert corresponding to the work assessment predictions at predefined intervals based on the break duration taken by the user and a break period predefined by the worker resource analysis module, and (v) provide a report of a projected departure time of the delivery vehicle from each of the multiple warehouse regions relative to the scheduled departure time based on a function of an amount of work remaining in the warehouse region, number of users operating in the warehouse region, current rate of work being accomplished, and current projected time of work completion.

11. The system of claim 10, comprising a visual display in communication with the computer.

12. The system of claim 11, wherein the visual display provides reports ef alerts corresponding to the work assessment predictions.

13. The system of claim 10, wherein the work assessment predictions comprise information that more workers are needed in the warehouse region.

14. The system of claim 10, wherein the work assessment predictions comprise information that the delivery vehicle from the warehouse region will be delayed beyond scheduled departure time.

15. The system of claim 10, wherein the work assessment predictions are based upon a number of work units remaining in the warehouse region, a number of users present in a warehouse region's workforce, and the rate at which work is being completed in the warehouse region.

16. The system of claim 10, wherein the work assessment predictions comprise determining idle time duration around break duration.

17. A method for managing worker resources, comprising:
transmitting task data from a server computer to a voice-directed mobile terminal in communication with the server computer;
providing speech-based instructions associated with task data to a user using the voice-directed mobile terminal, wherein the user is assigned a picking task in one of multiple warehouse regions and each warehouse region has a delivery vehicle with a scheduled departure time;
recording a voice communication between the user and the voice-directed mobile terminal with a corresponding timestamp based at least in part upon the voice communication received from the voice-directed mobile terminal over a communication link;
recording user activity information from the voice-directed mobile terminal based on recorded voice communication at the time the voice communication occurred, wherein the user activity information comprises of at least one of a break duration, a user idle time after sign-in, a user idle time before sign-off, a user idle time before beginning break activity, and a user idle time after returning from break activity;

analyzing user activity information to
- (i) identify user productivity patterns,
- (ii) provide work assessment predictions;
- (iii) provide an alert corresponding to the work assessment predictions at predefined intervals based on the break duration taken by the user and a predefined break period;
- (iv) provide a report of a projected departure time of the delivery vehicle from each of the multiple warehouse regions relative to the scheduled departure time based on a function of an amount of work remaining in the warehouse region, number of users operating in the warehouse region, current rate of work being accomplished, and current projected time of work completion; and implementing worker resource decisions in response to the analysis of the user activity information.

18. The method of claim 17, wherein the worker resource decisions comprise providing a productivity compliance alert to a worker related to break duration compliance based on the corresponding timestamps.

19. The method of claim 17, wherein the worker resource decisions comprise transferring a worker to a second work region from a first work region.

20. The method of claim 17, wherein the worker resource decisions are based upon a number of work units remaining in the warehouse region, a number of users present in a warehouse region's workforce, and the rate at which work is being completed in the warehouse region.

* * * * *